United States Patent
Nagano

[11] Patent Number: 5,979,266
[45] Date of Patent: Nov. 9, 1999

[54] BRAKE CONTROL APPARATUS FOR BICYCLE

[75] Inventor: Masashi Nagano, Izumi, Japan

[73] Assignee: Shimano Industrial, Co., Osaka, Japan

[21] Appl. No.: 08/282,783

[22] Filed: Jul. 25, 1994

Related U.S. Application Data

[60] Continuation of application No. 08/034,213, Mar. 19, 1993, abandoned, which is a division of application No. 07/633,767, Dec. 26, 1990, abandoned.

[30] Foreign Application Priority Data

Dec. 26, 1989 [JP] Japan .................................. 1-339403

[51] Int. Cl.⁶ .................................................. F16C 1/10
[52] U.S. Cl. .......................................... 74/502.2; 74/489
[58] Field of Search ........................ 74/489, 526, 502.2; 188/196 BA, 2 D, 24.11

[56] References Cited

U.S. PATENT DOCUMENTS

| | | | |
|---|---|---|---|
| 2,770,980 | 11/1956 | Millward | 74/489 |
| 3,546,960 | 12/1970 | Masuda | 74/483 |
| 4,279,174 | 7/1981 | Ross | 74/551.1 X |
| 4,819,497 | 4/1989 | Romano | 74/489 |
| 4,899,610 | 2/1990 | Bourret | 74/502.2 |
| 4,903,799 | 2/1990 | Romano | 74/489 X |

FOREIGN PATENT DOCUMENTS

| | | | |
|---|---|---|---|
| 0389931 | 3/1990 | European Pat. Off. | 74/502.2 |
| 90125489 | 7/1992 | European Pat. Off. | 74/502.2 |
| 863609 | 9/1939 | France | 74/502.2 |
| 908362 | 4/1946 | France | 74/502.2 |
| 54848 | 8/1950 | France | 74/502.2 |
| 1210326 | 3/1960 | France | 74/489 |
| 1326831 | 1/1963 | France | 74/502.2 |
| 2481221 | 10/1981 | France | 74/502.2 |
| 57-9193 | 2/1982 | Japan | 74/502.2 |
| WO 87/05576 | 9/1987 | WIPO | 74/502.2 |

*Primary Examiner*—Vinh T. Luong

[57] ABSTRACT

A brake control apparatus for a bicycle. The appratus has a control lever operatively connected with a control cable for pulling the cable and a force transmission ratio adjuster mechanism for adjusting a force transmission ratio in association with an operation of the control lever. The force transmission ratio is defined as a ratio obtained by dividing an output force from the cable associated with application of a unit input force to a certain lever position of the control lever. With the appratus of the invention, this force transmission ratio is so determined as to have a maximum value at a position during an entire stroke of the lever between a stroke start end and a stroke finish end and the maximum value position is on the side of the finish end after a play stroke on the side of the start end.

10 Claims, 6 Drawing Sheets

BRAKE CONTROL APPARATUS FOR BICYCLE

This application is a continuation of application Ser. No. 08/034,213 filed Mar. 19, 1993, now abandoned, which is a divisional of application Ser. No. 07/633,767 filed Dec. 26, 1990, now abandoned.

BACKGROUND OF THE INVENTION

1. Field of the Invention

The present invention relates to a brake control apparatus for a bicycle, and more particularly to a brake control apparatus having a control lever and a cable operatively connected to the lever to be pulled thereby.

2. Description of the Related Art

With a typical conventional brake control apparatus of the above-noted type, the control lever is pivotably supported to a bracket and the control cable is fitted into a hole formed at the root end of the control lever. Accordingly, the connecting portion of the control cable relative to the lever is maintained fixed relative to the pivot of the control lever (e.g. Japanese published utility model gazette No. 57-9193).

For fully understanding the sprits of the present invention, it should be helpful to define and explain here some essential concepts on which the invention is based.

First, a cable movement ratio is defined here as a ratio obtained by dividing an output force of and along the cable associated with application of a unit input force to a certain position of the control lever by said unit input force.

Second, considering the possibility that the input force applied to the lever substantially equates with the amount of work transmitted to the cable; then, a cable movement ratio is defined here as a ratio which varies in inverse proportion to the above force transmission ratio. That is to say, this cable movement ratio is obtained by dividing an amount of movement of the lever associated with a unit operation amount of the lover at a certain position thereof by said unit lever operation amount. These cable movement ratio and the force transmission ratio are predetermined by the construction of the brake control apparatus per se and are not directly affected by elastic modulus of the brake shoe and/or of the cable.

Then, during an initial stroke of the lever where this force transmission ratio has a relatively small value, even if a considerably large unit input force is applied to the lever. That is, even if the control lever is pulled with a considerably large manual force, the cable output force remains relatively smell thus being unable to bring the brake shoes into sufficiently effective pressure contact with the rim of a bicycle wheel. On the other hand, if the same amount of input force is applied in the subsequent stroke, the cable output force will be excessive thus too quickly establishing the pressure contact between the shoes and the rim.

In connection with this problem, according to the conventional apparatus, however, the distance between the pivot of the control lever and the connecting portion of the cable remains fixed throughout the operational stroke of the lever; that is, the force transmission ratio remains fixed regardless of the lever position subjected to the input force. Further, with the convention, the cable is connected with the lever so that within the limited entire stroke of the control lever the force transmission ratio has the minimum value during the braking stroke of the lever where the contact between the shoes and the rim is established. Therefore, it is impossible to maintain the force transmission ratio relatively high through the braking stroke of the lever. In short, even a relatively large amount of lever movement can often fail to provide sufficient braking force. In addition, since even a small amount of lever movement results in a large amount of movement of the shoes, a fine braking action has been very difficult.

Accordingly. the primary object of the present invention is to provide an improved brake control apparatus which can apply a strong braking force even with a small input force and which makes a fine braking action readily possible.

SUMMARY OF THE INVENTION

For accomplishing the above-noted object, a brake control apparatus for a bicycle according to the first characterizing features of the present Invention, the apparatus comprises: a control lever operatively connected with a control cable for pulling the cable; a force transmission ratio adjuster mechanism for adjusting a force transmission ratio in association with an operation of the control lever, the force transmission ratio being defined as a ratio obtained by dividing an output force from the cable associated with application of a unit input force to a certain lever position of the control lever; wherein the force transmission ratio is so determined as to have a maximum value at a position during an entire stroke of the lever between a stroke start end and a stroke finish end, the maximum value position being on the side of the finish end after a play stroke on the side of the start end.

According to the above first features of the invention, the force transmission ratio adjuster mechanism is provided for adjusting a force transmission ratio in association with an operation of the control lever. Thus, the ratio between the lever input force and the cable output force resulting therefrom can be freely adjusted according to each lever position. Further, the force transmission ratio is so determined as to have a maximum value at a position during an entire stroke of the lever between a stroke start end and a stroke finish end, and this maximum value position is set on the side of the finish end after a play stroke on the side of the start end. Then, during a braking stroke where the brake shoes are placed in effective contact with the rim, the force transmission ratio has a large value. Moreover, if the input force applied to the lever substantially equates with the amount of work transmitted to the cable, during the braking stroke, the cable movement ratio has a relatively small value because of the large force transmission ratio.

Accordingly, during the braking stroke, because of the large force transmission ratio, application of even a small input force to the lever can provide a strong braking foce. Further, because of the small cable movement ratio, the effective shoes-rim contact takes place relatively gradually, whereby fine braking force adjustment is possible.

On the other hand, during the play stroke, because of the large cable movement ratio, even if the shoes and rim are disposed with a good clearance therebetween, the contact takes place relatively quickly, whereby a quick braking action is possible. Moreover, with reduction in the play stroke, more portion of the entire lever stroke can be utilized as the braking stroke. Therefore, the braking adjustment can be effected even more finely.

Furthermore, since the force transmission ratio has its maximum value at a position within an entire lever stroke between the stroke start end and the stroke finish end, this force transmission ratio has a small value. Accordingly, as closer to the stroke finish end, the less of the lever operating force is transmitted to the cable, thus effectively preventing a skid accident where excessively strong lever action results in locking of the brake shoes and the rim.

According to the second characterizing features of the invention, a brake control apparatus for a bicycle comprises: a control lever operatively connected with a control cable for pulling the cable; and a force transmission ratio adjuster mechanism for adjusting a force transmission ratio in association with an operation of the control lever, the force transmission ratio being defined as a ratio obtained by dividing an output force from the cable associated with application of a unit input force to a certain lever position of the control lever; wherein the force transmission ratio is so determined as to have a maximum value at a position during an entire stroke of the lever between a stroke start end and a stroke finish end, the maximum value position being on the side of the finish end after a play stroke on the side of the start end and the maximum value position being on the side of the start end before a skid stroke on the side of the finish end.

With the above-described second characterizing features of the invention, the force transmission ratio is to determined as to have a maximum value at a position during an entire stroke of the lever between a stroke start end and a stroke finish end, and this maximum value position is set on the side of the finish end after a play stroke on the side of the start end and also the maximum value position is on the side of the start end before a skid stroke on the side of the finish end. Accordingly, this construction is even more effective for the prevention of skid accident then the construction with the first-described features.

According to the third characterizing features of the invention, in addition to the above second features, the force transmission ratio is so determined that an average value thereof during a braking stroke is larger than further respective average values thereof in the play stroke and in the skid stroke.

With the above third characterizing feature of the invention, the average value of the force transmission ratio during a braking stroke is larger than further respective average values of the ratio in the play stroke and in the skid stroke. With this additional feature, the apparatus can provide more efficient braking effect during the braking stroke than in the other strokes.

Preferably, according to the fourth characterizing features of the invention, in addition to the above first or third features, the maximum value position is set on the side of the stroke finish end beyond a transition stroke continuous from the play stroke, mechanical play present in a brake system being compensated for during the transition stroke.

With the further characterizing features, the maximum value position is out of the transition stroke. Therefore, the apparatus can provide strong braking force at the proper stroke range, thus further reinforcing the effects obtained by the first or third feature.

Still preferably, according to the fifth characterizing features of the invention, the control cable is so connected to the control lever that moment acting on the control lever in association with operation of the lever at the certain lever position is transmitted to the control cable, and the force transmission ratio adjuster mechanism effects the ratio adjustment by varying a ratio of an arm length of moment on the cable by a further arm length of the moment on the lever.

With the above fifth characterizing features of the invention, first, the control cable is so connected to the control lever that moment acting on the lever in association with operation of the lever at the certain lever position is transmitted to the control cable. Then, the moment on the control lever in caused to substantially equate with that on the control cable. Second, since the force transmission ratio adjuster mechanism effects the ratio adjustment by varying a ratio of an are length of moment on the cable by a further arm length of the moment on the lever, the distinguished effects of the invention can be achieved simply by arrangement of the lengths of the moment arms. This provides the manufacturer with a greater designing freedom. Moreover, the arrangement of the moment arm lengths can be simply achieved by varying one arm length relative to the other. This is advantageous for simpleness of the construction.

Still preferably, according to the sixth characterizing features of the invention, the control lever is pivotably supported to a bracket via a lever shaft while the control cable is operatively connected with the lever via a cable connecting portion. And, the force transmission adjuster mechanism is constructed as a cam device adapted for pivoting the cable connecting portion in association with operation of the control lever closer to and away from the lever shaft; the cable connecting portion being moved closest to the lever shaft at the lever position corresponding to the maximum value of the force transmission ratio.

With the sixth characterizing features of the invention, the means for varying the moment arm lengths comprises the cam device. Thus, the desired construction can be designed by drafting a cam diagram, independently of the further construction for moving the control lever. With the aid of the cam diagram, it is possible to reliably and readily determine a proper lever position where the force transmission ratio has the maximum value as a function relative to a lever operation amount as a variable. Moreover, since the control lever is pivotably supported to the bracket by way of the lever shaft, there occurs no problem of deterioration in the lever strength against e.g. accidental fall of the bicycle.

Still preferably, according to the seventh characterizing features of the invention, in addition to the above sixth features, the cam device includes; a movement allowing face formed on the control lever for allowing the relative movement between the cable connecting portion and the lever shaft, and a cam face formed on the bracket in association with the movement allowing face.

With the above-described seventh feature of the present invention, the cam device includes a movement allowing face formed on the control lever for allowing the relative movement between the cable connecting portion and the lever shaft and a cam face formed on the bracket in association with the movement allowing face. Accordingly, through a crossing point between a moving path of the cable connecting portion on the movement allowing face and a further moving path of the same on the cam face, this cable connecting portion can be moved to and away from the lever shaft in the desired manner. Moreover, since the cable connecting portion subjected to a strong cable pulling force is effectively supported by the movement allowing face, the construction can advantageously protect the cam device against damage, whereby the entire apparatus can serve for an extended period of time.

As described in details as above, the present invention has fully achieved the intended object of providing an improved brake control apparatus which can apply a strong braking force even with a small input force and which makes a fine braking action readily possible. As also described hereinbefore, the invention's apparatus is advantageous also for preventing the dangerous skid accident due to locking of the brake shoes and the wheel rim. Moreover, with the effective utilization of the manual lever operating force, the apparatus provides the user with less fatigue under severe riding condition where strong and fine braking actions are required very frequently. Consequently, the invention's apparatus affords the user greater safety.

Further and other objects, features and effects of the invention will become more apparent from the following sore detailed description of the embodiments of the Invention with reference to the accompanying drawings.

BRIEF DESCRIPTION OF THE DRAWINGS

Accompanying drawings FIGS. 1 through 8 illustrate a brake control apparatus according to one preferred embodiment of the present invention; in which, FIG. 1 is a vertical section of the apparatus, FIG. 2 is a graph of a force transmission ratio, FIG. 3 is a graph of a cable movement ratio, FIG. 4 is a principle diagram, FIG. 5 is an exploded view showing a bracket body and a cable connecting device, FIG. 6 is a side view showing the bracket body, FIG. 7 is a plane view showing the bracket body alone, and FIG. 8 is a section view taken along a line 8—8 of FIG. 1;

Further drawings FIGS. 9 through 11 illustrate other embodiments of the invention; in which, FIGS. 9 and 10 show major portions in the vicinity of a lever shaft, and FIG. 11 is a graph of a force transmission ratio.

DESCRIPTION OF THE PREFERRED EMBODIMENTS

Preferred embodiments of the invention will now be described in particular with reference to the accompanying drawings.

FIGS. 1 through 8 show a first embodiment of the invention.

Figure 1:
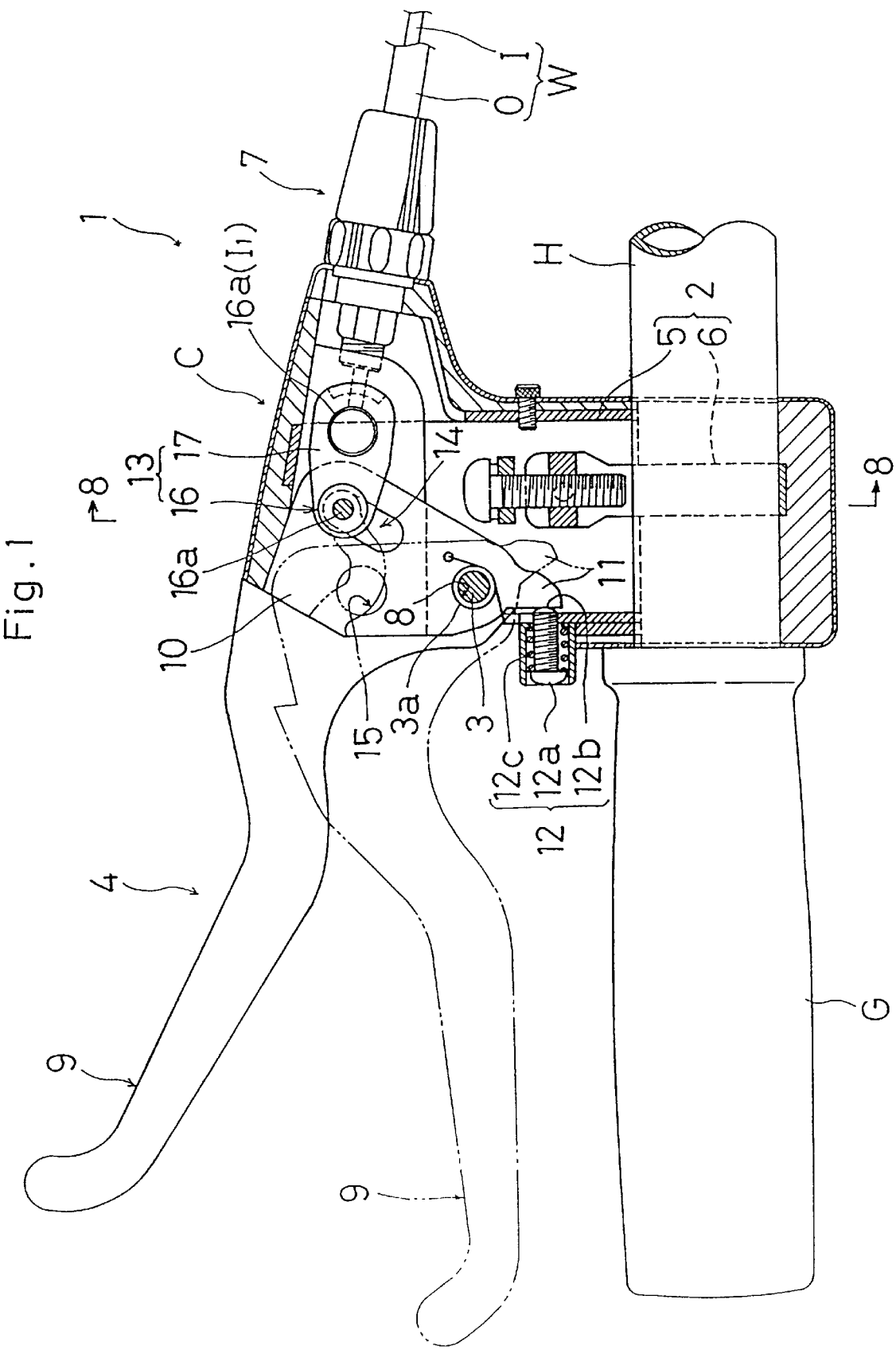
Figure 7:
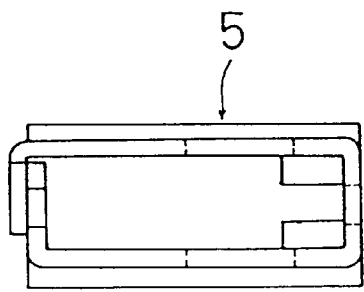
Figure 8:
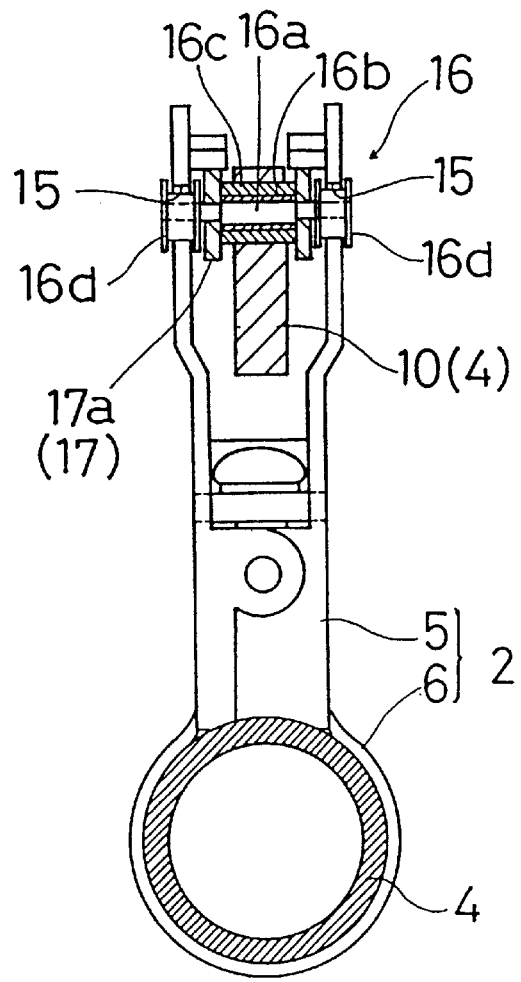

Referring now to FIGS. 1, 7 and 8, a brake control apparatus 1 of this embodiment includes a bracket 2 to be attached adjacent a grip G of a bicycle handle bar H and a control lever 4 pivotably supported to the bracket 2 via a lever shaft 3. On and about the lever shaft 3, there is fitted a lever spring 3a having its legs placed in abutment with the bracket 2 and the lever 4, respectively in order to urge the control lever 4 to its home position, i.e. a stroke start end. The bracket 2 includes a bracket body 5, shaped rectangular in cross section, for supporting the lever and an attaching member 6 for attaching the bracket body 5 to the handle bar H. This bracket 2 is entirely coated with resin. A cable structure W, to be operatively connected with this brake control apparatus for transmitting braking force from this apparatus to brake shoes disposed adjacent a wheal rim of the bicycle, includes an inner cable I, acting as a brake control cable, and an outer tube O covering the inner cable I. For connecting this cable structure W, the bracket body 5 includes, at a right upper position thereof, an outer tube receiver 7 for receiving the outer tube O while adjusting an exposed length of the inner cable I relative to this outer tube O. Accordingly, when the inner cable I is pulled, this cable I effects a relative movement with respect to the fixedly positioned outer tube O. That is, the brake control apparatus effects a braking operation by pulling, i.e. moving the inner cable I relative to the outer tube O in association with a user's manual operation on the control lever 4. With this apparatus operation, the brake shoes of an unillustrated brake device are brought into effective pressure contact with the wheel rim for braking a running bicycle.

As shown in FIG. 1, the control lever 4 defines, at its base portion, a through hole 8 through which the lever shaft 3 is inserted. The control lever 4 further includes a control portion 9 having a substantially 'U'-shaped longitudinal cross section and extending toward the grip G when attached to the handle bar H and has, at the base portion thereof, a narrow portion 10 projectable into and withdrawable from the interior of the bracket body 5 when the lever 4 is pivotably operated for a braking action. The control portion 9 includes an input portion for receiving an input force. Also, downwardly of the through hole 8, there is formed a projection 11 used for setting. This projection 11 will be detailed later.

As still shown in FIG. 1, in an entire stroke of the control lever 4, a stroke start position S is restricted by a start end setting element 12 attached to the bracket body 5 and a stroke finish postion E is restricted either by an exposed length of the inner cable I which length is adjusted by the outer tube receiver 7 or by abutment against the grip G. Refering more particularly to the setting of the stroke start and S of the control lever 4, this start end S is restricted by abutment between the start end setting element 12 disposed downwardly of the lever shaft 3 inside the bracket body 5 and the setting projection 11 of the control lever 4. For this abutment between the element 12 and the projection 11, an adjuster screw 12a is screwed into the bracket body 5 and its leading end 12b is so disposed as to come into abutment against the setting projection 11. Further, a coil spring 12c is fitted about the adjuster screw 12a for restricting rotation of this screw 12a. Accordingly, through adjustment of rotational amount of the adjuster screw 12a, fine adjustment of the stroke start end S of the control lever 4 can be made.

Figure 5:
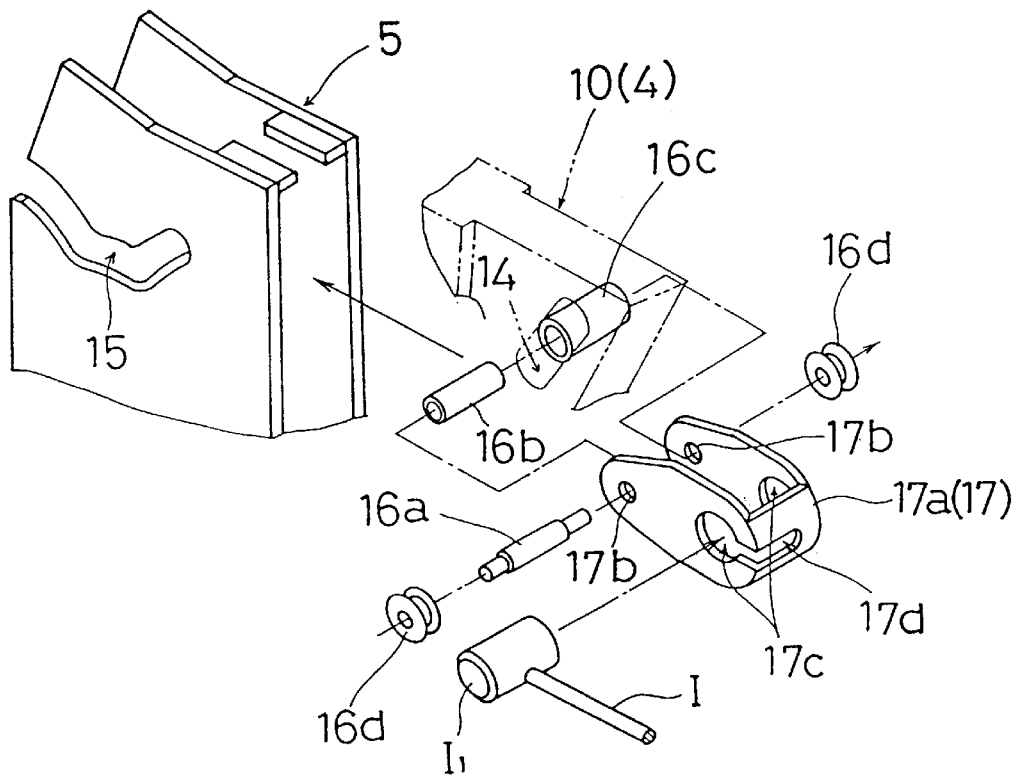
Figure 6:
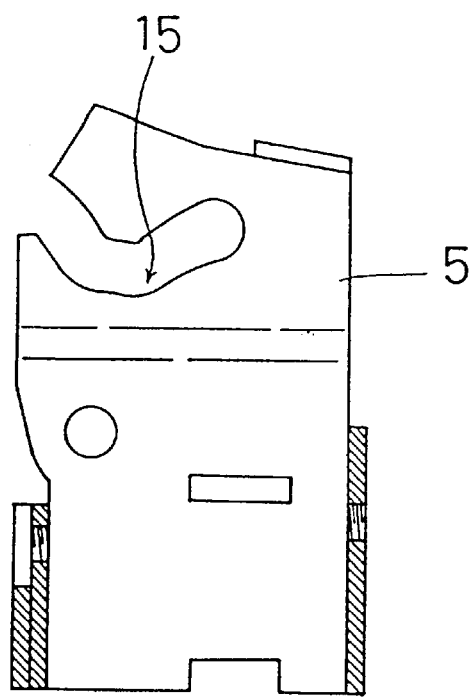

As shown in FIGS. 1 and 5, there is provided a cam device C including a cable connecting element 13 functioning as a cable connecting portion for operatively connecting the inner cable I with the control lever 4, an elongated slot 14 acting as a movement allowing face defined in the control lever 4, and a cam groove 15 acting as a cam face defined in the bracket body 5. The control lever 4 includes an output portion for applying a tension force through the cable connecting element 13 to the brake cable.

As further shown in FIGS. 1 and 5, the cable connecting element 13 includes a cam follower 16 for sliding contact with the elongated slot 14 and the cam groove 15 and a cable retainer 17 for connecting the inner cable I to the can follower 16. More particularly, the cam follower 16 includes a cable hook shaft 16a made of metallic material and having stepped ends (i.e. of reduced diameter), and a resin tube 16b and a metallic tube 16c fitted one after the other in the mentioned order on the middle portion of the hook shaft 16a. Further, resin rollers 16d each having a flange are fitted on the stepped ends of the hook shaft 16a. All the above elements 16b, 16c and 16d are rotatably fitted on the hook shaft 16a. Also, the resin tube 16b and the resin rollers 16d are formed of an appropriate resin material having small frictional resistance and good anti-friction strength. The cable retainer 17 is mainly comprised of a base member 17a having a gate-like bent shape consisting of one bridge part and a pair of side parts continuous through the bridge part. Adjacent one distal ends of the side parts, there is defined a hook hole 17b for the insertion of the cable hook shaft 16a therethrough. Adjacent the other distal ends of the side parts, there is defined a nipple hole 17c for insertion of a nipple 11 of one distal end of the inner cable I, and continuously with the nipple hole 17c and extending into the bridge part, there is defined an insertion slot 17d for allowing sidewise insertion of the inner cable I and also for retaining the nipple 11 thereat.

Figure 3:
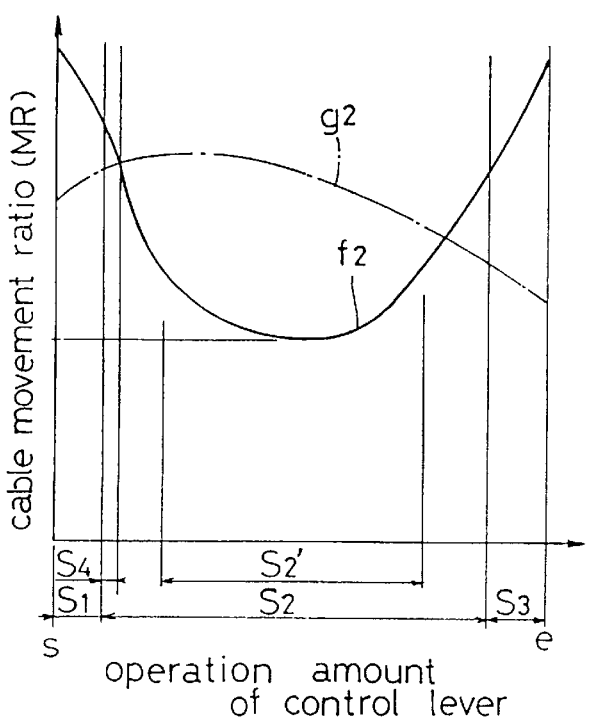

As shown in FIGS. 3 and 8, the cam groove 15 is formed in the opposed lateral sides of the bracket body 5. The shoping arrangement of this cam groove 15 will be detailed later. The elongated slot 14 is formed at the narrow portion 10 of the control lever 4 in such a manner that the slot 14 longitudinally extends radially about the lever shaft 3. Further, the metallic tube 16c of the cam follower 16 is fitted into this elongated slot 14 while the resin roller 16d is fitted into the cam groove 15. Also, the side parts of the base member 17a of the cable retainer 17 are disposed sidewise across the elongated slot 14 and the cable hook shaft 16a is inserted into the hook hole 17b so as to operatively connect the cable retainer 17 with the cam follower 16. In operation, a3 the control lever 4 is pivotably actuated by a user's manual operation, the cable connecting element 13 is pivoted for moving the cam follower 16 to and away from the lever shaft 3. Incidentally, through abutment between the opposed flanges of the resin rollers 16d against the side edges of the cam groove 15, movement of these resin rollers 16d along the lever shaft 3 is effectively restricted. Also, in this condition, the rollers 16d fitted on the opposed stepped ends of the cable hook shaft 16a effectively prevent inadvertent fallout of this shaft 16a.

Figure 4:
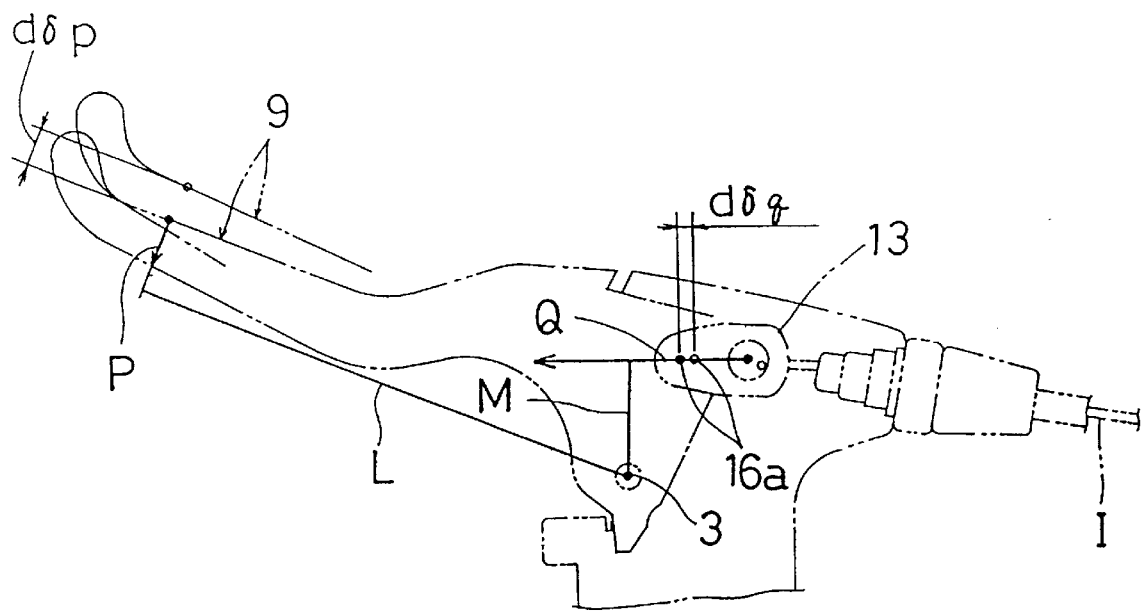

According to the above-detailed construction, as illustrated in FIG. 4, moment acting on the lever 4 with application of manual force to a certain lever position is transmitted to the cable connecting element 13. Then, this moment acting on the control lever 4 can be obtained as a product of an input force P applied to a certain position of the lever multiplied by a length L of an input arm defined by a perpendicular line drawn from the lever shaft 3 to an extension of the line of the input force. Although the magnitude and direction of this input force P varies according to the operation of the control lever 4, the amount of this variation is negligible. Therefore, the input arm length L can be considered as substantially constant through the entire stroke of the lever 4, regardless of the operational position of the lever 4. On the other hand, moment acting on the cable connecting element 13 is obtained as a product of an output force Q acting along the longitudinal direction of the inner cable I associated with the input force P of the control lever 4 multipled by a length M of an output arm defined by a perpendicular line drawn from the lever shaft 3 to an extension of the output force. Then, since the magnitudes of the moment acting on the control lever 4 and that acting on the cable connecting element 13 are substantially the same, we obtain:

$$P \times L = Q \times M \qquad (a)$$

$$Q = (P \times L)/M \qquad (b)$$

That is, it is possible to adjustably vary the output force Q by varying the output arm length M.

In the instant embodiment, the cam groove 15 is curved facing the opposite side to the lever shaft 3 so that the cable connecting element 13 is positioned most adjacent the lever shaft 3 for rendering the output force arm length M short at a position between the stroke start end and the stroke finish end and on the side of the finish end after the play stroke on the side of the start end.

Referring to FIG. 4, relationships among the output force value Q of the Inner cable I, the force transmission ratio PR and the cable movement ratio MR will next be described in details.

Suppose a small moving distance of the control portion 9 caused by a unit input force P to the control lever 4 at its certain position is dδp and a small moving distance of the inner cable I caused by the same unit input force P is dδq; then, according to the law of conservation of momentum, we have:

$$P \times d\delta p = Q \times d\delta q \qquad (c)$$

The above equation (c) can be rewritten into an equation (d) below:

$$P/Q = d\delta q/d\delta p = (MR) \qquad (d)$$

Then, assuming that the value of the input force P of the moment acting on the control lever 4 is substantially constant, the cable movement ratio MR varies in inverse proportion to the value of the output force Q.

Further, the above equation (d) can be rewritten into an equation (e) below:

$$(PR) = 1/(MR) \qquad (e)$$

Therefore, the force transmission ratio PR varies in inverse proportion to the cable movement ratio MR.

Next, the shaping of the cam groove 15 will be detailed with reference to FIGS. 2 and 3 graphically showing the interrelated variations of the force transmission ratio PR and the cable movement ratio MR.

Figure 2:
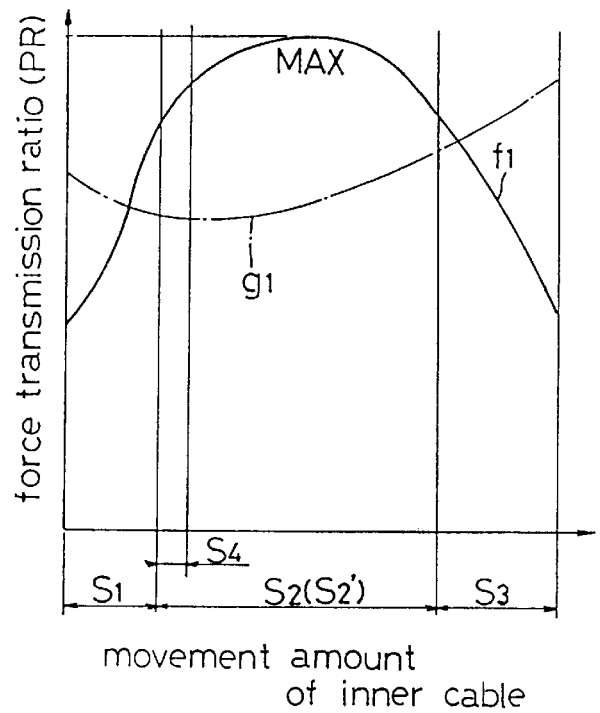

In FIG. 2, a function curve f1 represents variation of the force transmission ratio PR with respect to variation in the movement amount of the inner cable I which is represented by the X axis. In FIG. 3, a function curve f2 represents variation of the cable movement ratio MR with respect to variation in the operation amount of the control lever 4 which is represented by the X axis. In these graphs, the entire stroke of the control lever 4 consists of three continuous ranges between the stroke start end (s) and the stroke finish end (e), that is, the play stroke S1 before and until the brake shoes come into effective contact with the wheel rim of the bicycle, the braking stroke S2 where the brake shoes brake the rotating rim after the contact, and the skid stroke S3 where the brake shoes and the rim are locked with each other thus causing a skid of the bicycle wheel on the ground. The control lever 4 moves through a play stroke position during the play stroke S1. Incidentally, adjacent the braking stroke on the stroke start and, there exists a transition stroke S4 continuous with the play stroke S1. In this transition stroke S4, mechanical play present in the entire brake system of the bicycle is compensated for. That is to say, the effecting braking action takes place on the side of the stroke finish end after this transition stroke S4.

Then, in the construction of the instant embodiment, the can groove 15 corresponding to the braking stroke S2 is positioned adjacent the lever shaft 3 (see FIG. 6) so that the force transmission ratio PR has its maximum value MAX within the braking stroke S2 and on the side of the stroke finish end (e) beyond the transition stroke S4, as shown in FIG. 2. With this, as shown in FIG. 3, the cable movement ratio MR, which varies in inverse proportion to the force transmission ratio MR, has its minimum value MIN within the braking stroke S2 and on the side of the stroke finish and (e) beyond the transition stroke S4. Accordingly, during this braking stroke S2, because of the large value of the force transmission ratio PR, even with application of a relatively small input force to the control lever 4, the bicycle can be braked with a sufficiently large force. Further, during this braking stroke S2, because of the small value of the cable movement ratio MR, the inner cable I is moved by a relatively smell amount even when the lever 4 is operated by a large amount. Therefore, the effective contact between the shoes and the rim is established relatively gradually, whereby fine braking force adjustment is possible.

On the other hand, during the play stroke S1, the cam groove 15 corresponding to the play stroke S1 is positioned distant from the lever shaft 3 (see FIG. 6) so that the force transmission ratio PR has a small value during this play stroke S1. With this, the cable movement ratio MR has a small value as shown in FIG. 3. Accordingly, even if the brake shoes and the rim are disposed with a good clearance therebetween, a small amount of operation on the control lever can quickly establish the shoes-rim contact, thus enabling a quick braking action.

Further, during the skid stroke S3 too, the cam groove 15 corresponding to this skid stroke S3 is positioned distant from the lever shaft 3 (see FIG. 6) so that the force transmission ratio PR has a small value during this skid stroke S3 as well. Accordingly, during this skid stroke S3, the operational force on the control lover 4 is transmitted to the inner cable I less efficiently, thus preventing a skid phenomenon when the lever is pulled excessively. Moreover, the cyclist feels this reduction in the force transmission ratio from the braking stroke S2 to the skid stroke S3 as sudden increase in the heaviness of the lover operation. Consequently, the cyclist can become aware of the danger of skid beforehand. Furthermore, according to the above-described arrangement, most of the entire stroke of the control lever 4 is used as the braking stroke S2. This further facilitates the fine braking force adjustment.

As may be illustrated by the function curves f1 and f2 in FIGS. 2 and 3, the average value of the force transmission ratio PR during the braking stroke is sufficiently larger than the average values thereof in the play stroke and in the skid stroke. Accordingly, the above-described functions and effects can be fully achieved.

Incidentally, a further function curve g1 of FIG. 2 represents variation of the force transmission ratio PR of the conventional apparatus with respect to variation in the movement amount of the inner cable I represented by the X axis. Similarly, a further function curve g2 of FIG. 3 represents variation of the cable movement ratio MR of the conventional apparatus with respect to variation in the operation amount of the control lever 4. Reference mark S2' denotes a braking stroke of this convention. As shown, the braking stroke S2 obtained by the apparatus of the present invention is greater than the stroke S2' of the convention. And, also during this braking stroke S2, the force transmission ratio PR of the invention's apparatus is greater than that of the convention, whereby even a small operation force can provide a strong braking effect.

The brake control apparatus of the above embodiment is constructed for use with a flat handle bar employed often in so-called all-terrain bicycles. However, the present invention can be embodied as an apparatus adapted for any other shape of handle bar, such as a drop handle bar.

Some other embodiments of the invention will now be described specifically.

In the foregoing embodiment, the force transmission ratio adjuster mechanism C comprises the cam device. Instead, this mechanism C can be of any other type to be described next.

Figure 9:
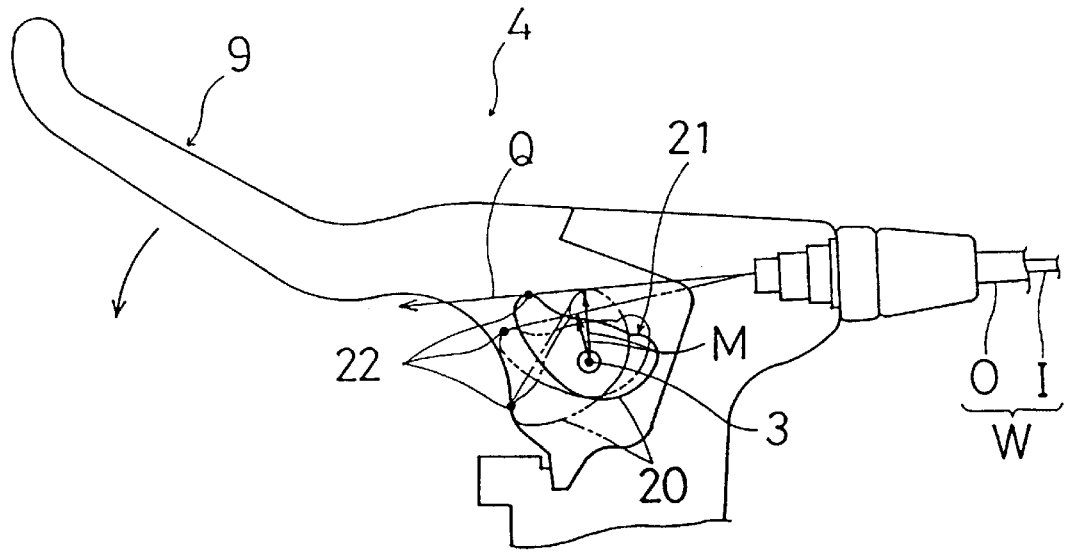

In this second embodiment shown in FIG. 9, the see elements as those in the foregoing embodiment are provided with the same reference numerals. Reference numeral 20 denotes a take-up member rotatable about the lever shaft 3 in association with a pivotal operation of the control lever 4 so as to take up the inner cable I thereabout. This take-up member 20 includes an outer peripheral portion 21 and a retainer portion 22 provided at a part of the peripheral portion 21 for retaining the cable nipple 11, In operation, in association with a pulling pivotal operation of the control lever 4, the take-up member 20 takes up the inner cable I about its outer peripheral portion 21 to pull this cable I. In the course of this take-up action, the distance between the lever shaft 3 and the outer peripheral portion 21 varies in accordance with the lever position, thus varying the length M of the cable moment arm and consequently adjusting the force transmission ratio PR.

Figure 10:
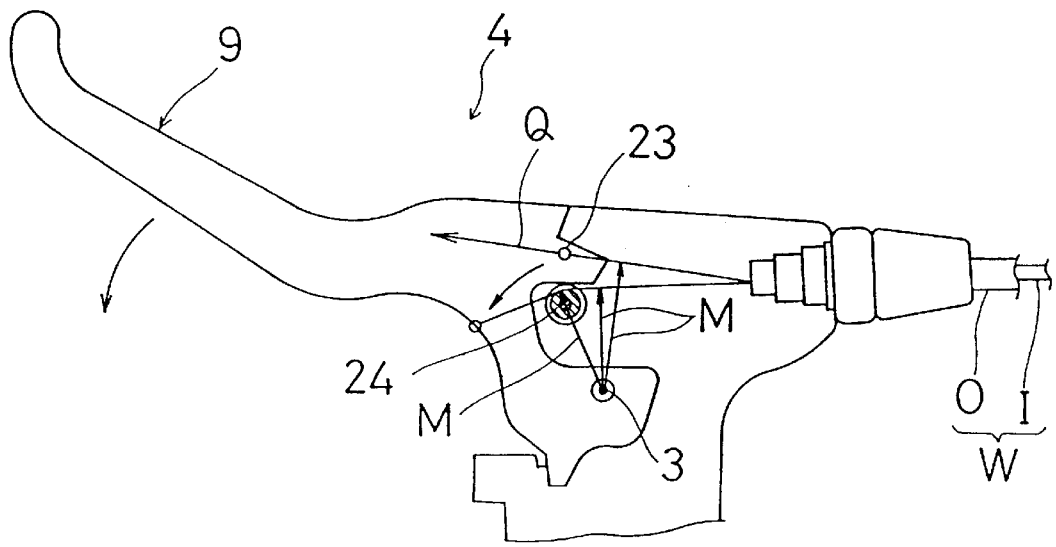

A third embodiment will now be described with reference to FIG. 10. In the alternate construction of this embodiment, at one side of the base portion of the control lever 4, there is provided a shaft 22, about which a cable retainer element 23 is loosely fitted. Further, forwardly with respect to the pivotal direction of the control lever 4 when pulled, a contact roller 24 contactable with the inner cable I is pivotably attached to the bracket body 5. In operation, as the control lever 4 is pulled, the inner cable I comes closer to the lever shaft 3 thus gradually shortening the output arm length M. Thereafter, as the lever 4 is further pulled, the inner cable I comes into contact with the contact roller 24, thus swithing over the direction of the output force Q of the cable moment thus increasing the output arm length M again. In this way, the force transmission ratio PR is adjusted by this construction.

Next, some other modified constructions will be described specifically.

(A) In the foregoing embodiments, the adjustment of the force transmission ratio PR is affected by varying the output arm length M. Instead, the adjustment is possible by varying the input arm length L, or by varying both arm lengths M and L. For instance, it is conceivable to construct a quadrople link mechanism by privotably attaching the control lever 4 to the bracket body 5 by means of a pair of link elements. Then, by appropriately setting pivot-to-pivot distances of this mechanism, the input arm length L can be changed for varying the force transmission ratio PR to a desired value.

(B) In the foregoing embodiments, the work applied to the control lever 4 is directly transmitted to the inner cable I. Instead, it is also conceivable for the work to be transmitted indirectly to the cable I. For instance, it is conceivable to interpose, between the control lever 4 and the bracket body 5, a compression coil spring pivotable in association with a pivotal pulling operation of the control lever 4, such that during the play stroke S1 this compression spring is compressed to store the applied work thus reducing the force transmission ratio PR while during the braking stroke S2 the spring is released from the compression thus releasing the stored work and consequently increasing the force transmission ratio PR. Further, if the center axis of this compression spring is appropriately set in accordance with the pivoting amount of the control lever 4, it is possible to again reduce the force transmission ratio PR during the skid stroke S3. Therefore, with this modified construction too, the force transmission ratio PR can be varied to a desired value.

Figure 11:
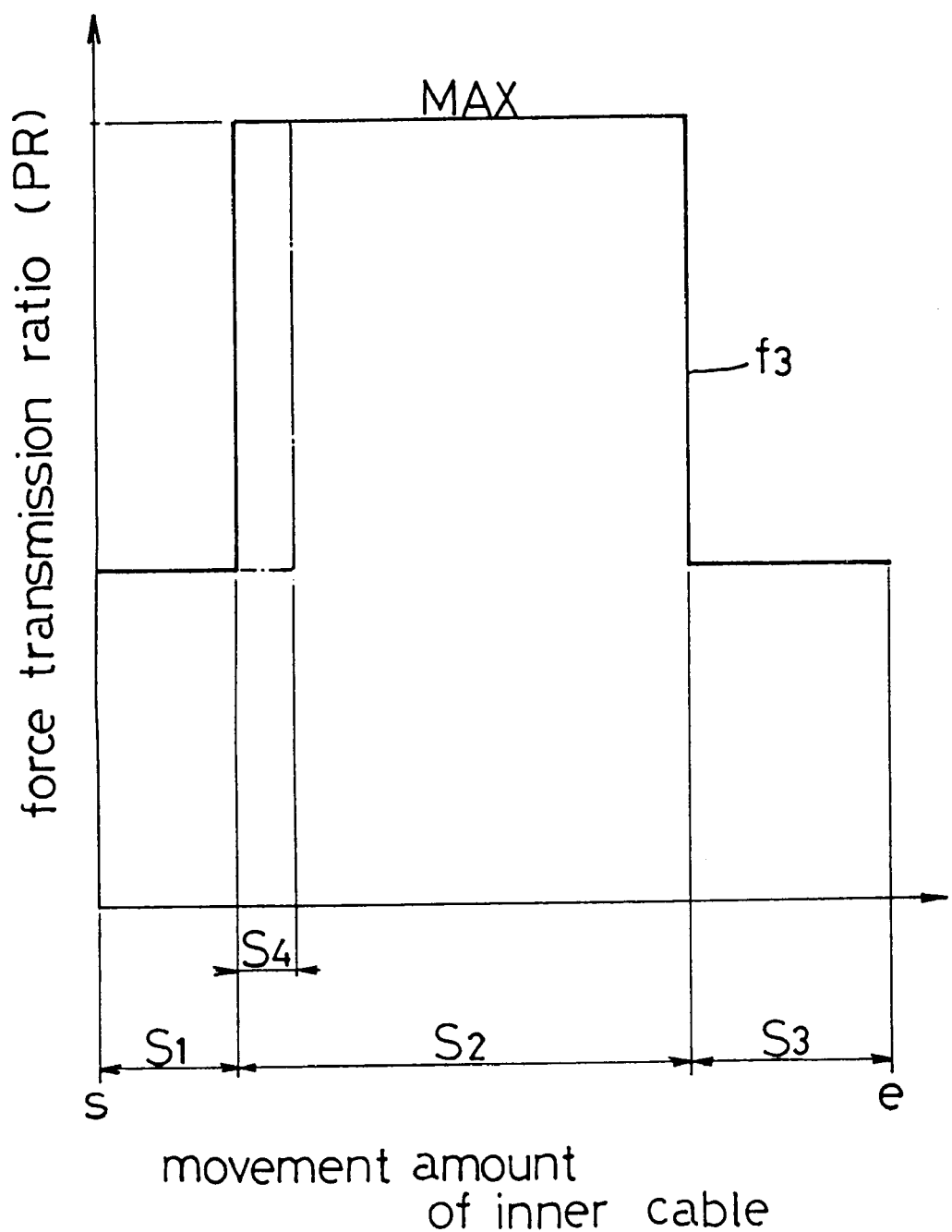

(C) In the embodiment illustrated in FIG. 2, the maximum value MAX of the force transmission ratio PR is denoted by one point in the function curve f1. However, according to the essential spirits of the invention, it is to be understood that as shown by a further function curve f3 in FIG. 11 this maximum value MAX can be a segment having a certain width rather than a single point. Similarly, the minimum value of the transmission force ratio PR can be a segment, as well. Indeed, this function curve f3 of FIG. 11 is the most suitable characteristics for achieving the distinguished effects of the present invention. It is also conceivable to further modify this construction such that the force transmission ratio PR drops conspicuously sharply adjacent the border between the braking stroke S2 and the skid stroke S3. This modification is advantageous for making the cyclist aware of the danger of skidding as he feels sudden increase in the mechanical resistance against his pulling of the lever 4. Incidentally, is the function curve f3 can be as denoted by a dotted line of the drawing so that the maximum value MAX may be positioned on the side of the stroke finish end (e) beyond the transition stroke S4.

(D) In the foregoing embodiment, the movement allowing face is constructed as the elongated slot 14 while the cam face is constructed as the cam groove 15 and the cam follower 16 is fitted into these slot and groove. Various modifications of this construction are conceivable. For instance it is conceivable to provide a pair of projections having the movement allowing face and the cam face, respectively so that the cam follower comes into sliding contact with the projections.

(E) In the foregoing embodiments, the cable structure W has the outer tube O as well as the inner cable I. Instead, it is also conceivable to use the inner cable I alone, while eliminating the outer tube O.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A brake control apparatus for a bicycle, the apparatus comprising:

a lever axis, a control lever, and a cable connecting portion for operatively connecting said control lever to a control cable, said control lever being pivoted about said lever axis, said control lever having an input portion for receiving an input force and an output portion for applying a tension force through said cable connecting portion to the cable to pull the cable, said control lever being movable through a cable pulling stroke from a stroke start position, through a play stroke position, and to a stroke finish position; and a force transmission ratio adjuster mechanism for changing a force transmission ratio as said control lever moves through said cable pulling stroke, said force transmission ratio being equal to the tension force applied to the cable divided by the input force received by said control lever, said force transmission ratio adjuster mechanism including a guide cam surface that curves toward and away from said lever axis to guide said cable connecting portion toward and then away from said lever axis as said control lever moves from said stroke start position to said stroke finish position, whereby said force transmission ratio increases and then decreases as said control lever moves through said cable pulling stroke, with said force transmission ratio having a maximum value when said control lever is located between said play stroke position and said stroke finish position.

2. A brake control apparatus for a bicycle comprising:
a lever axis;

a control cable;

a control lever pivotable about the lever axis between a stroke start position and a stroke end position;

a guide cam surface; and a cable connector coupled to the control cable and disposed within the guide cam surface, wherein the guide cam surface is arranged so that a distance between the cable connector and the lever axis decreases and then increases as the control lever moves between the stroke start end and the stroke finish end.

3. A brake control apparatus as defined in claim 2, wherein a force transmission ratio has a maximum value when said control lever is located at a maximum value position, said maximum value position being between the stroke finish end and a transition stroke position, said control lever being in said transition stroke position during a transition stroke, and wherein mechanical play present in a brake system is compensated for during said transition stroke.

4. A brake control apparatus as defined in claim 3, wherein said cable connector is moved closest to said lever axis when said control lever is in the maximum value position.

5. A brake control apparatus as defined in claim 4, further comprising a bracket for supporting said control lever, and a movement allowing face formed on said control lever for allowing relative movement between said cable connector and said lever axis, and wherein said guide cam surface is formed on said bracket.

6. A brake control apparatus as defined in claim 2, wherein a force transmission ratio is so determined that an average value thereof during a braking stroke is larger than further respective average values thereof in a play stroke and in a skid stroke, wherein said control lever passes through said play stroke position during said play stroke, and wherein said control lever arrives at said stroke finish end during said skid stroke.

7. A brake control apparatus as defined in claim 6, wherein said force transmission ratio has a maximum value when said control lever is located at a maximum value position, said maximum value position being between the stroke finish end and a transition stroke, said control lever being in said transition stroke position during a transition stroke, and wherein mechanical play present in a brake system is compensated for during said transition stroke.

8. A brake control apparatus as defined in claim 7, wherein said cable connector is moved closest to said lever axis when said control lever is in the maximum value position.

9. A brake control apparatus as defined in claim 8, further comprising a bracket for supporting said control lever, and a movement allowing face formed on said control lever for allowing relative movement between said cable connector and said lever axis, and wherein said guide cam surface is formed on said bracket.

10. A brake control apparatus for a bicycle, the apparatus comprising:

a lever axis, a control lever, and a cable connecting portion for operatively connecting said control lever to a control cable, said control lever being pivoted about said lever axis, said control lever having a control portion for receiving an input force and a slot for applying a tension force through said cable connecting portion to the cable to pull the cable, said control lever being movable through a cable pulling stroke from a stroke start end, through a play stroke, and to a stroke finish end; and a force transmission ratio adjuster mechanism for changing a force transmission ratio as said control lever moves through said cable pulling stroke, said force transmission ratio being equal to the tension force applied to the cable divided by the input force received by said control lever, said force transmission ratio adjuster mechanism including a guide cam surface with the cable connecting portion disposed therein, and wherein said guide cam surface is arranged so that a distance between the cable connector and the lever axis decreases and then increases as said control lever moves from said stroke start end to said stroke finish end, whereby said force transmission ratio increases and then decreases as said control lever moves through said cable pulling stroke, with said force transmission ratio having a maximum value when said control lever is located between said play stroke and said stroke finish end.

* * * * *